(12) United States Patent
Marocchini et al.

(10) Patent No.: US 9,010,366 B2
(45) Date of Patent: Apr. 21, 2015

(54) PNEUMATIC PORT SHIELD

(71) Applicant: Hamilton Sundstrand Corporation, Windsor Locks, CT (US)

(72) Inventors: Francis P. Marocchini, Somers, CT (US); Scott J. Beloncik, Westfield, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 241 days.

(21) Appl. No.: 13/792,939

(22) Filed: Mar. 11, 2013

(65) Prior Publication Data
US 2014/0251466 A1 Sep. 11, 2014

(51) Int. Cl.
*E03B 3/18* (2006.01)
*B01D 35/157* (2006.01)
*F16K 15/00* (2006.01)

(52) U.S. Cl.
CPC .............. B01D 35/157 (2013.01); F16K 15/00 (2013.01)

(58) Field of Classification Search
USPC ............ 137/315.22, 343, 375, 377, 544, 545, 137/549, 573; 251/127, 305, 62, 366; 92/78, 143; 220/913, 745
See application file for complete search history.

(56) References Cited

U.S. PATENT DOCUMENTS

| | | | | |
|---|---|---|---|---|
| 5,058,858 A | * | 10/1991 | Korpi | 251/127 |
| 5,080,125 A | * | 1/1992 | Boski | 137/72 |
| 5,638,857 A | * | 6/1997 | Alcumbrack | 137/377 |
| 6,536,468 B1 | * | 3/2003 | Wilmer et al. | 137/544 |
| 7,975,714 B2 | * | 7/2011 | Newman et al. | 137/68.23 |

FOREIGN PATENT DOCUMENTS

| | | |
|---|---|---|
| DE | 202004011911 U1 | 1/2005 |
| EP | 2377593 A1 | 10/2011 |

OTHER PUBLICATIONS

The European Search Report for Application No. GB1403672.7 mailed Mar. 14, 2014.

* cited by examiner

*Primary Examiner* — Craig Schneider
*Assistant Examiner* — Ian Paquette
(74) *Attorney, Agent, or Firm* — Kinney & Lange, P.A.

(57) ABSTRACT

A port shield assembly includes a cup, a fitting, and a retaining pin. The cup includes a top with a hole, a sidewall, a cavity defined by the top and the sidewall, and a side port in the side wall. The fitting includes a body with a first end and a second end, a flange at the first end, and a central bore extending from the first end. The fitting also includes a port that communicates with the central bore, and a cross bore near the second end. The fitting extends through the hole of the cup and a retaining pin is disposed in the cross bore to retain the cup between the first end and the second end of the fitting.

20 Claims, 4 Drawing Sheets

PNEUMATIC PORT SHIELD

BACKGROUND

This invention relates to pneumatic air valves and pneumatic air actuators. More particularly, this invention relates to ambient ports on pneumatic air valves and pneumatic air actuators.

Pneumatic air valves and actuators have long been used in aerospace applications, such as engine air starters in helicopters, due to their light weight, efficient packaging capability, and their ability to operate over a large temperature variation. Pneumatic air valves and actuators are designed to work against a reference pressure, the reference pressure generally being set at ambient pressure. Ambient ports are formed in the casing of pneumatic air valves and actuators to supply ambient air pressure to the reference sides of pneumatic air valves or actuators. Historically, pneumatic air valves and actuators have not incorporated filtration of the ambient ports.

As aerospace applications expand, so have the performance requirements of pneumatic air valves and actuators. Performance accuracy of pneumatic air valves and actuators depends upon tight control tolerances and small mechanical clearances. New applications have produced more challenging operating environments that expose the pneumatic air valves and actuators to increased external air contamination. Testing has revealed that unfiltered ambient ports allow ingestion of particles when the pneumatic air valves and actuators are subjected to external particles being driven at the unit. The ingested particles affect the performance of the pneumatic air valves and actuators by clogging the small mechanical clearances present in the pneumatic air valves and actuators. Though the use of filters on the ambient ports would prevent the ingestion of particles into the pneumatic air valves and actuators through the ambient ports, filters constrict the air flow through the ambient ports, impacting the reference pressure of the pneumatic air valves and actuators which impacts their performance. In addition, due to the amount of potential contaminate to which each pneumatic air valve unit is subjected, incorporating filtration is not considered a reasonable solution.

SUMMARY

In one aspect of the invention, a port shield assembly includes a cup, a fitting, and a retaining pin. The cup includes a top with a hole, a sidewall, a cavity defined by the top and the sidewall, and a side port in the side wall. The fitting includes a body with a first end and a second end, a flange at the first end, and a central bore extending from the first end. The fitting also includes a port that communicates with the central bore, and a cross bore near the second end. The fitting extends through the hole of the cup and a retaining pin is disposed in the cross bore to retain the cup between the first end and the second end of the fitting.

In another aspect of the invention, a pneumatic actuator includes a casing wall with an inner side and an outer side. An air inlet port extends through the first and second sides of the casing wall. A port shield assembly includes a cup disposed on the outer side of the casing wall over the air inlet port. The cup includes a top with a hole, a sidewall, and a cavity defined by the top and the sidewall. A side port is formed in the sidewall. The body of a fitting extends through the hole in the cup and the air inlet port such that a first end of the fitting is on the inner side of casing wall and a second end of the fitting extends past the top of the cup. A flange is disposed at the first end of the fitting and a central bore extends from the first end of the fitting. The fitting also includes a port that communicates with the central bore and is disposed on the fitting body between the top of the cup and the outer side of the casing wall. A cross bore is disposed near the second end of the fitting and a retaining pin is disposed in the cross bore. The retaining pin retains the cup between the second end of the fitting and the outer side of the casing wall.

In another aspect of the invention, a pneumatic actuator includes a casing wall with an inner side and an outer side. An air inlet port extends through the first and second sides of the casing wall. A port shield assembly includes a cup disposed on the outer side of the casing wall over the air inlet port. The cup includes a top with a hole, a sidewall, and a cavity defined by the top and the sidewall. Side ports are formed in the sidewall. The body of a fitting extends through the hole in the cup and the air inlet port such that a first end of the fitting is on the inner side of casing wall and a second end of the fitting extends past the top of the cup. A flange is disposed at the first end of the fitting and a central bore extends from the first end of the fitting. The fitting also includes ports that communicate with the central bore and are disposed on the fitting body between the top of the cup and the outer side of the casing wall.

DETAILED DESCRIPTION

The present invention provides a port shield assembly for protecting an ambient port of a pneumatic valve or actuator from the ingestion of particle contaminants without constricting the airflow across the ambient port. The port shield assembly shields the ambient port from particles by creating a tortuous air pathway into the ambient port. The port shield contains relatively few parts making it simple to assemble and giving it a low profile.

Figure 1:
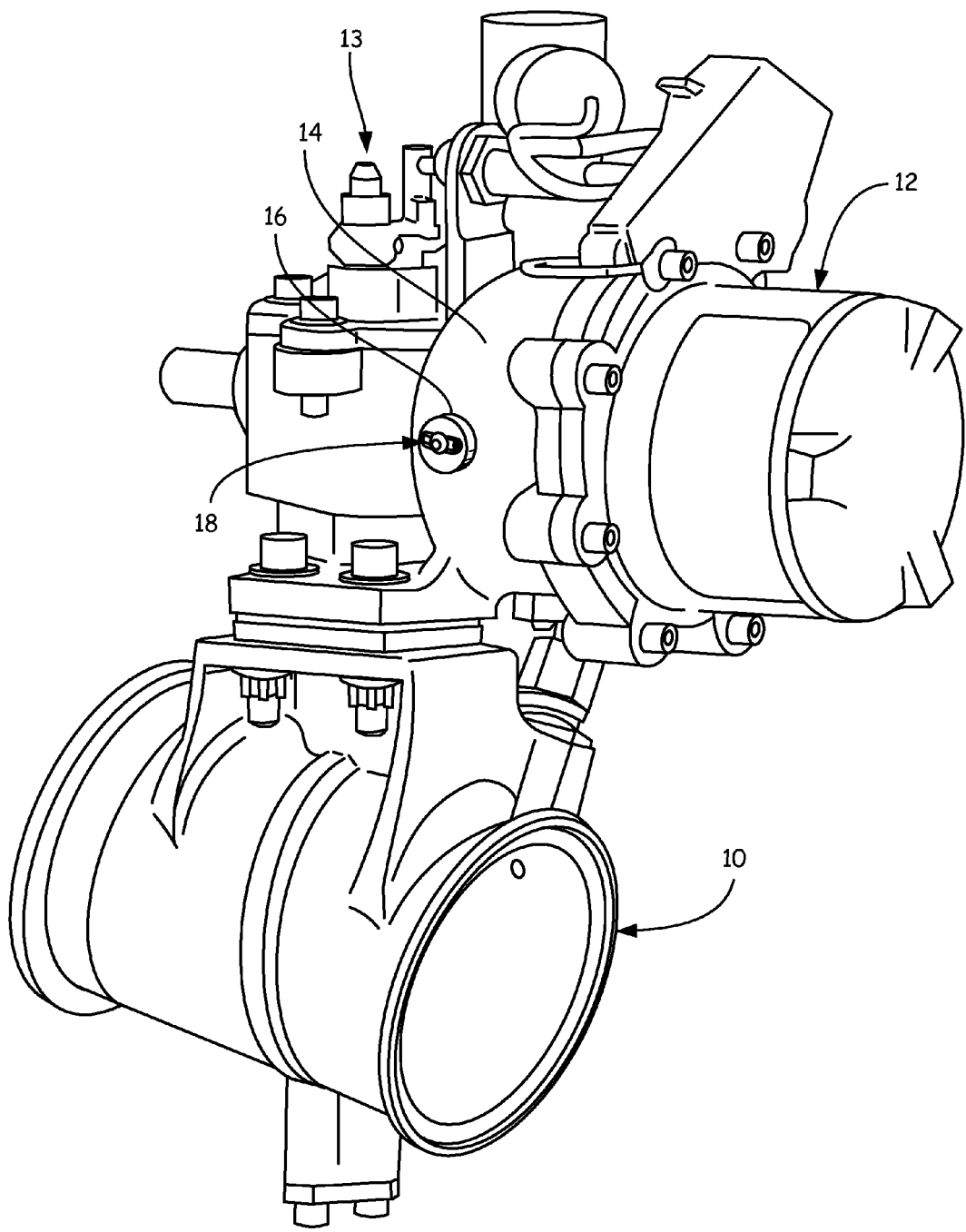
FIG. 1 is a perspective view of a pneumatic butterfly valve and actuator piston.

FIG. 1 is a perspective view of butterfly valve 10 and actuator piston 12. As shown in FIG. 1, actuator piston 12 is connected to butterfly valve 10 via drive shaft 13. Actuator piston 12 includes casing 14, ambient port 16, and shield assembly 18. Casing 14 covers a reference side of actuator piston 12. Ambient port 16 is formed in casing 14 and provides a passage in casing 14 that allows ambient air to enter the reference side of actuator piston 12. As discussed below in FIGS. 2-4, shield assembly 18 is connected to ambient port 16 to prevent actuator piston 12 from ingesting outside particle through ambient port 16.

Figure 2:
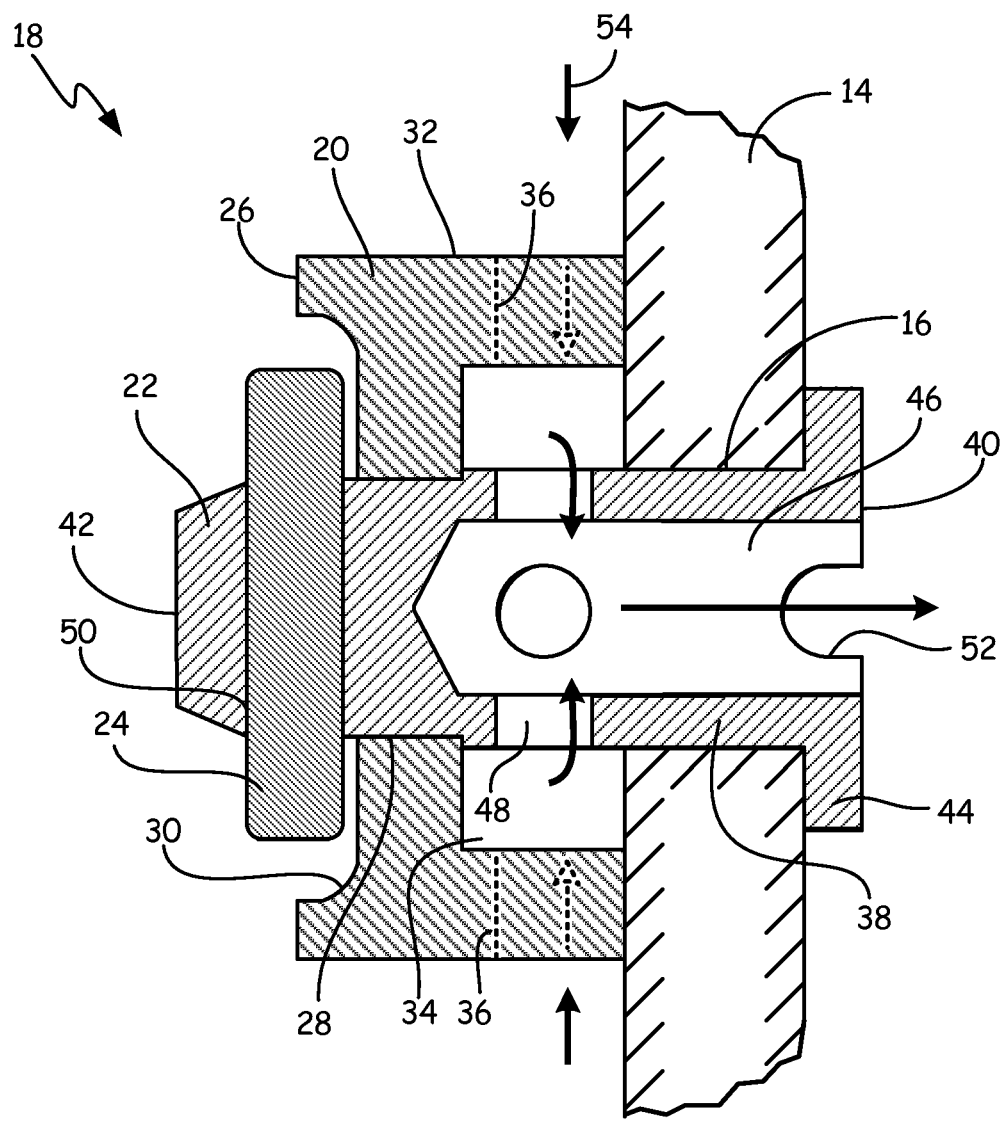
FIG. 2 is a cross-sectional view of a port shield assembly on an ambient air port of the actuator piston of FIG. 1.
Figure 3:
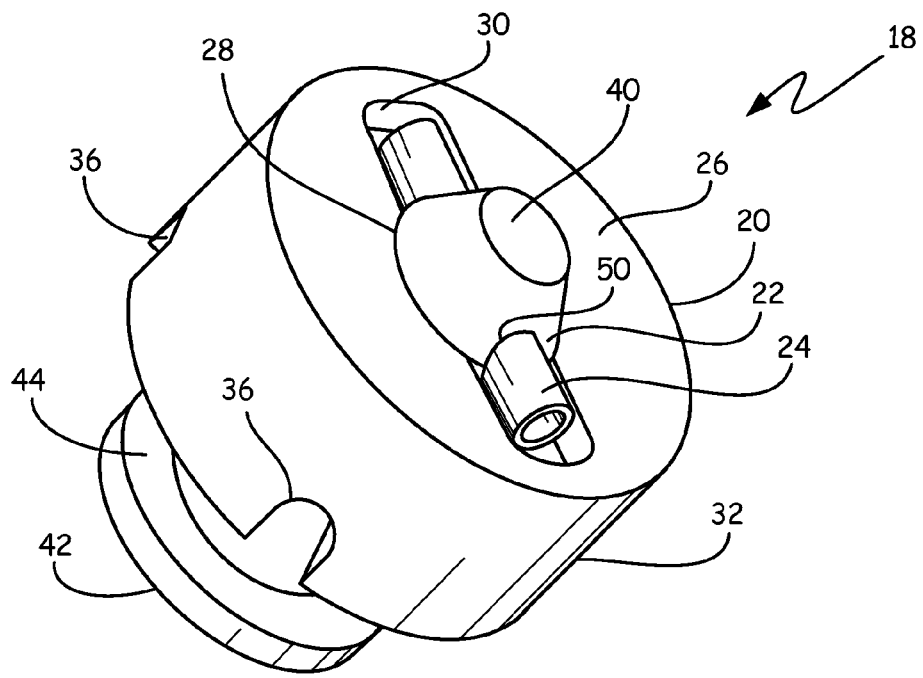
FIG. 3 is a perspective view of the port shield assembly of FIG. 2.
Figure 4:
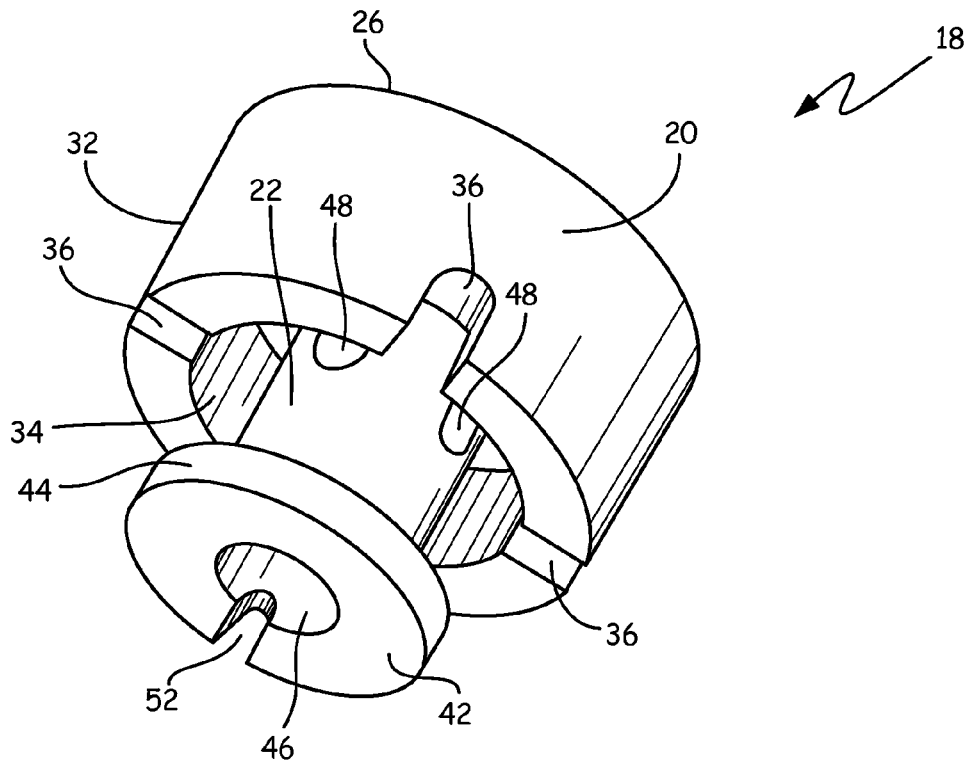
FIG. 4 is another perspective view of the port shield assembly of FIG. 3.

FIG. 2 is a cross-sectional view of casing 14, ambient port 16, and shield assembly 18 from the embodiment of FIG. 1. FIGS. 3 and 4 are perspective views of shield assembly 18 from FIG. 2. As shown in FIGS. 2-4, shield assembly 18 includes cup 20, fitting 22, and retaining pin 24. Cup 20 includes top 26, hole 28, groove 30, sidewall 32, cavity 34, and side ports 36 (shown in phantom in FIG. 2). Fitting 22 includes body 38, first end 40, second end 42, flange 44, central bore 46, ports 48, cross bore 50, and channel 52. Shield assembly 18 also includes tortuous airflow path 54.

Cup 20 is disposed on an outer side of casing 14 over ambient port 16. Hole 28 is formed on top 26 of cup 20, and cup 20 is positioned over ambient port 16 such that hole 28 is generally concentric with ambient port 16. Sidewall 32 is generally cylindrical and extends from top 26 to casing 14. Cavity 34 is defined by top 26 and sidewall 32 and is disposed between top 26 and casing 14. Sidewall 32 and cavity 34 are both larger in diameter than ambient port 16. Side ports 36 are formed in sidewall 32 and allow ambient air to enter cavity 34. Body 38 of fitting 22 extends between first end 40 and second end 42 of fitting 22. A length of fitting 22 between first end 40 and second end 42 is longer than a length of cup 20. Body 38 extends through ambient port 16 and hole 28 of cup 20 with first end 40 disposed on an inner side of casing 14 and second end 42 extending past top 26 of cup 20. Flange 44 is disposed at first end 40 and is larger in diameter than ambient port 16. Central bore 46 extends inside fitting 22 from first end 40 toward second end 42, stopping shy of second end 42. Ports 48 are formed on body 38 between top 26 of cup 20 and the outer side of casing 14. Ports 48 communicate with central bore 46 of fitting 22 and cavity 34 of cup 20. Ports 48 allow ambient air to enter central bore 46 from cavity 34. Ambient air traveling into central bore 46 from cavity 34 then travels across central bore 46 and ambient port 16 to the inner side of casing 14 inside actuator piston 12 discussed in FIG. 1. Side ports 36 are in-line or further outboard than port 48 to allow liquids that enter shield assembly 18 to drain, thereby preventing puddling inside shield assembly 18 which can potentially freeze and block side ports 36 and ports 48. Together, side ports 36 of cup 20, cavity 34 of cup 20, ports 48 of fitting 22, and central bore 46 of fitting 22 form tortuous airflow path 54. Tortuous airflow path 54 allows ambient air to flow from the outer side of casing 14 to the inner side of casing 14.

Each of side ports 36 of cup 20 includes a cross-sectional area that may be smaller than a cross-sectional area of central bore 46 of fitting 22. Collectively, the combined cross-sectional area of side ports 36 of cup 20 is at least as large as the cross-sectional area of central bore 46 of fitting 22. Because the combined cross-sectional area of side ports 36 of cup 20 is at least as large as central bore 46, side ports 36 of cup 20 are able to break up the flow of ambient air entering side ports 36 without restricting the flow of the ambient air into central bore 46 below the maximum flow capabilities of central bore 46. In addition, at least one of side ports 36 may be positioned downward, relative to gravity, to allow liquids to drain from shield assembly 18 and prevent fluid puddling and blockage inside shield assembly 18. Ports 48 of fitting 22 each include a cross-sectional area smaller than the cross-sectional area of central bore 46 of fitting 22. Ports 48 of fitting 22 include a combined cross-sectional area at least as large as the cross-sectional area of central bore 46 of fitting 22. Because the combined cross-sectional area of ports 48 of fitting 22 is at least as large as central bore 46, ports 48 of fitting 22 are also able to break up the flow of ambient air entering ports 48 without restricting the flow of the ambient air into central bore 46 below the maximum flow capabilities of central bore 46. To impede the entrance of particles into central bore 46 of fitting 22, side ports 36 of cup 20 are diametrically misaligned with ports 48 of cup 20. In FIG. 2, side ports 36 are shown in phantom to illustrate that they are diametrically misaligned with ports 48. By misaligning side ports 36 of cup 20 and ports 48 of fitting 22, tortuous airflow path 54 must curve inside cavity 34. Curving tortuous airflow path 54 causes air-born particles to lose momentum and separate from the ambient air flow. Furthermore, misaligning side ports 36 and ports 48 prevents the gravitational entry of particles across side ports 36 and ports 48 into central bore 46.

Cross bore 50 is formed on body 38 of fitting 22 near second end 42. Retaining pin 24 is disposed in cross bore 50 to positively retain cup 20 between second end 42 of fitting 22 and the outer side of casing 14. Groove 30 is formed on top 26 of cup 20 and intersects hole 28. Groove 30 receives at least a portion of retaining pin 24 and orientates fitting 22 such that cross bore 50 of fitting 22 is parallel with groove 30. At least some of ports 48 of fitting 22 may be parallel with cross bore 50 and groove 30 while all of side ports 36 of cup 20 are not parallel with groove 30 and cross bore 50. By receiving at least a portion of retaining pin 24, groove 30 prevents cup 20 and fitting 22 from rotating relative to one another, thereby ensuring that side ports 36 and ports 48 remain misaligned. As shown in FIG. 2, retaining pin 24 may be a solid pin. Retaining pin 24 may be hollow as shown in the embodiments of FIGS. 3 and 4.

Cup 20 may be made of a compliant material, such as rubber. By forming cup 20 from a compliant material, cup 20 may be elastically compressed to insert retaining pin 24 into cross bore 50 during the assembly of shield assembly 18 to ambient port 16 and casing 14. Forming cup 20 from a compliant material enables cup 20 to dampen shield assembly 18 and casing 14 against vibrations during the operation of actuator piston 12, shown in FIG. 1. To prevent galvanic corrosion between shield assembly 18 and casing 14, fitting 22 and retaining pin 24 may be formed from the same material as casing 14, which is generally aluminum, or from a material that is galvanically neutral with casing 14. Channel 52 is formed on first end 40 of fitting 22 and extends from an outer circumference of flange 44 to central bore 46. Channel 52 permits the drainage of water condensation inside casing 14 through ambient port 16 without requiring that the water first buildup inside casing 14 sufficient to flow over flange 44.

Figure 5:
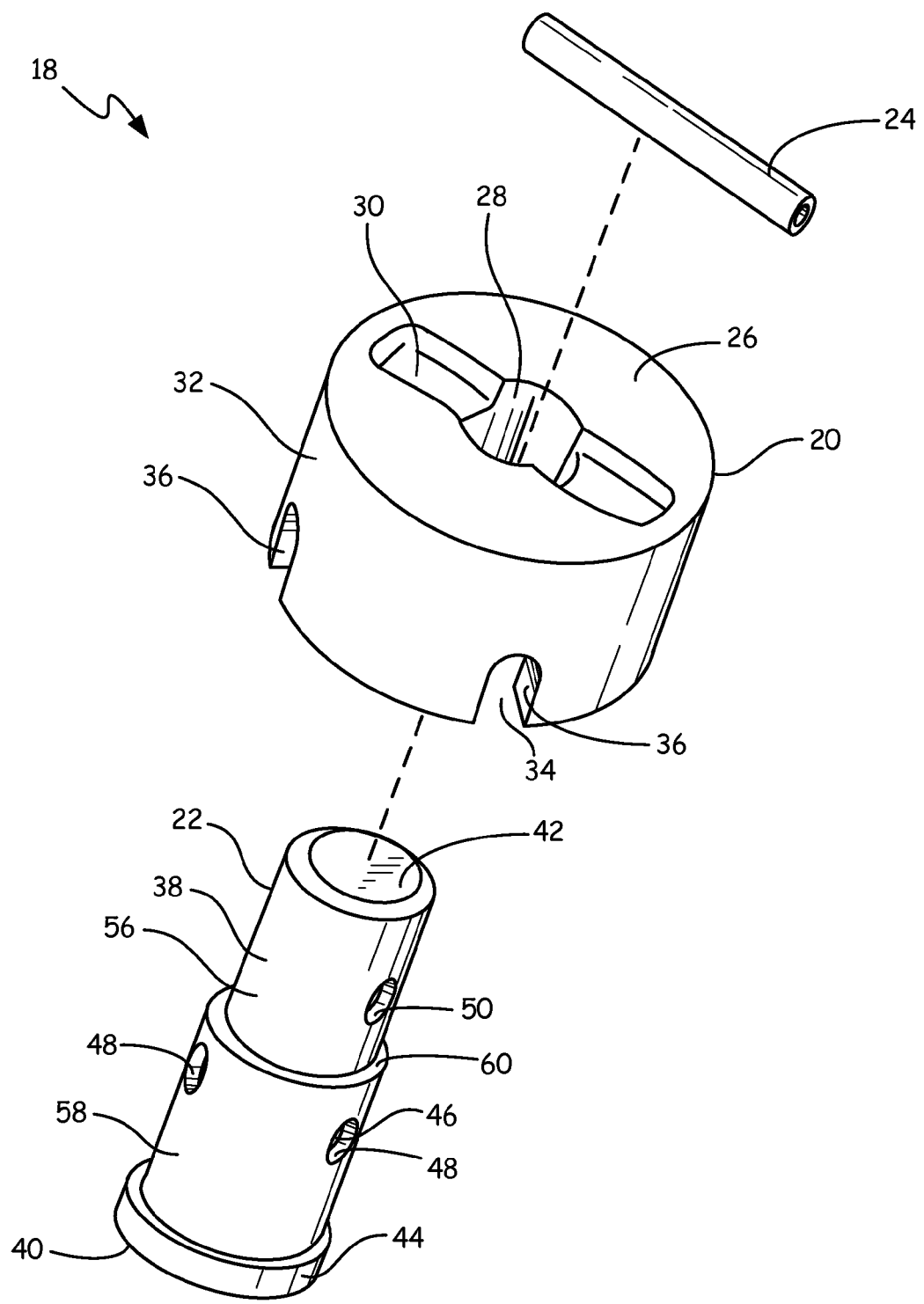
FIG. 5 is an exploded view of the port shield assembly of FIG. 4.

FIG. 5 is an exploded view of the port shield assembly of FIG. 4. As shown in FIG. 5, shield assembly 18 includes cup 20, fitting 22, and retaining pin 24. Cup 20 includes top 26, hole 28, groove 30, sidewall 32, cavity 34, and side ports 36. Fitting 22 includes body 38, first end 40, second end 42, flange 44, central bore 46, ports 48, cross bore 50, first diameter portion 56, second diameter portion 58, and shoulder 60.

In FIG. 5, components of like numbering with the components of FIGS. 2-4 are assembled as discussed above with reference to FIGS. 2-4. First diameter portion 56 extends between ports 48 and second end 42 of fitting 22. Second diameter portion 58 extends between first diameter portion 56 and flange 44 of fitting 22. Second diameter portion 58 is smaller in diameter than flange 44 and larger in diameter than first diameter portion 56. Central bore 46 is mostly disposed within second diameter portion 58. Because first diameter portion is largely solid, first diameter portion 56 can include a smaller diameter than second diameter portion 58 to reduce the overall weight of fitting 22 and shield assembly 18 without affecting the integrity of central bore 46. First diameter portion 56 is smaller in diameter than hole 28 of cup 20 to permit second end 42 of fitting 22 to mate with hole 28. Second diameter portion 58 is larger in diameter than hole 28 to prevent top 26 of cup 20 from covering ports 48 should sidewall 32 of cup 20 be compressed. Second diameter portion 58 of fitting 22 is smaller in diameter than cavity 34 of cup 20 to accommodate for tortuous flow path 54 that flows across cavity 34, as disclosed above with reference to FIGS. 3-5. Shoulder 60 may be disposed between first diameter portion 56 and the second diameter portion 58 to provide a seat for cup 20.

In view of the foregoing description, it will be recognized that the present disclosure provides numerous advantages and benefits. For example, the present disclosure provides shield assembly 18 with cup 20, fitting 22, and retaining pin 24. As a three piece assembly, shield assembly 18 maintains a low profile and is easy to reliably assemble. Furthermore, shield assembly 18 effectively shields ambient port 16 from particle ingestion without constricting the air flow rate across the ambient port 16. Shield assembly 18 can also be used on already existing ports and does not require any changes or redesigns on pneumatic actuators or valves and their ports.

While the invention has been described with reference to an exemplary embodiment(s), it will be understood by those skilled in the art that various changes may be made and equivalents may be substituted for elements thereof without departing from the scope of the invention. For example, while the specification describes cross bore 50 and retaining pin 24 connecting cup 20 to fitting 22, other means may be used to connect cup 20 to fitting 22, such as a threaded connection or a snap connection between cup 20 and fitting 22. Furthermore, while the invention has been described in reference to pneumatic actuators and valves, the invention may be used in any application where a pressure port may require shielding from particle ingestion. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A port shield assembly, comprising:
   a cup comprising:
      a top with a hole and a groove;
      a sidewall;
      a cavity defined by the top and the sidewall; and
      a side port in the sidewall;
   a fitting comprising:
      a body having a first end and a second end;
      a flange disposed at the first end;
      a central bore extending from the first end;
      a port communicating with the central bore; and
      a cross bore near the second end;
   a retaining pin; and
   wherein the fitting extends through the hole of the cup and the retaining pin is disposed in the cross bore to retain the cup between the first end and the second end of the fitting.

2. The port shield assembly of claim 1, wherein the port of the fitting is diametrically misaligned with the side port of the cup.

3. The port shield assembly of claim 1, wherein the port of the fitting is parallel with the cross bore of the fitting.

4. The port shield assembly of claim 1, wherein a channel extends from an outer circumference of the flange to the central bore.

5. The port shield assembly of claim 1, wherein a length of the fitting between the first end and the second end of the fitting is longer than a length of the cup.

6. The port shield assembly of claim 1, wherein the cup is made of a compliant material.

7. The port shield assembly of claim 1, wherein the cup is made of rubber.

8. The port shield assembly of claim 1, wherein the groove of the cup intersects the hole and is parallel with the cross bore of the fitting and the port of the fitting.

9. The port shield assembly of claim 1, wherein the groove and the side port of the cup are not parallel.

10. The port shield assembly of claim 1, wherein the fitting further comprises:
    a first diameter portion extending between the port of the fitting and the fitting second end;
    a second diameter portion extending between the first diameter portion and the flange of the fitting; and
    wherein the second diameter portion comprises a diameter smaller than a diameter of the flange and larger than a diameter of the first diameter portion.

11. The port shield assembly of claim 10, wherein the first diameter portion is smaller in diameter than the hole of the cup and the second diameter portion is larger in diameter than the hole of the cup.

12. The port shield assembly of claim 11, wherein the second diameter portion of the fitting is smaller in diameter than the cavity of the cup.

13. A pneumatic actuator comprising:
    a casing wall with an inner side and an outer side;
    an air inlet port extending through the first and second sides of the casing wall; and
    a port shield assembly comprising:
       a cup disposed on the outer side of the casing wall over the air inlet port,
       the cup comprising:
          a top with a hole;
          a sidewall;
          a cavity defined by the top and the sidewall; and
          a side port in the sidewall;
       a fitting comprising:
          a body with a first end opposite a second end, wherein the body extends through the hole in the cup and the air inlet port with the first end on the inner side of the casing wall and the second end extending past the top of the cup;
          a flange disposed at the first end;
          a central bore extending from the first end;
          a port communicating with the central bore and disposed on the body between the top of the cup and the outer side of the casing wall; and
          a cross bore near the second end; and
       a retaining pin disposed in the cross bore to retain the cup between the second end of the fitting and the outer side of the casing wall.

14. The pneumatic actuator of claim 13, wherein the cavity of the cup is larger in diameter than the air inlet port.

15. The pneumatic actuator of claim 13, wherein a groove is formed on the top of the cup and receives at least a portion of the retaining pin to prevent the cup from rotating on the fitting.

16. The pneumatic actuator of claim 15, wherein the flange of the fitting is larger in diameter than the air inlet port.

17. A pneumatic actuator comprising:
    a casing wall with an inner side and an outer side;
    an air inlet port extending through the first and second sides of the casing wall; and
    a port shield assembly comprising:
       a cup disposed on the outer side of the casing wall over the air inlet port,
       the cup comprising:
          a top with a hole;
          a sidewall;
          a cavity defined by the top and the sidewall; and
          side ports in the sidewall;
       a fitting comprising:

a body with a first end opposite a second end, wherein the body extends through the hole in the cup and the air inlet port with the first end on the inner side of the casing wall and the second end extending past the top of the cup;

a flange disposed at the first end;

a central bore extending from the first end; and ports communicating with the central bore and disposed on the body between the top of the cup and the outer side of the casing wall.

18. The pneumatic actuator of claim 17, wherein the ports of the fitting each include a cross-sectional area smaller than a cross-sectional area of the central bore of the fitting, and the ports of the fitting include a combined cross-sectional area at least as large as the cross-sectional area of the central bore of the fitting.

19. The pneumatic actuator of claim 17, wherein the side ports of the cup each include a cross-sectional area smaller than a cross-sectional area of the central bore of the fitting, and the side ports of the cup include a combined cross-sectional area at least as large as the cross-sectional area of the central bore of the fitting.

20. The pneumatic actuator of claim 17, wherein pneumatic actuator further comprises:

a cross bore near the second end of the fitting; and a retaining pin disposed in the cross bore to retain the cup between the second end of the fitting and the outer side of the casing wall.

\* \* \* \* \*